US009767533B2

(12) United States Patent
Bedi et al.

(10) Patent No.: US 9,767,533 B2
(45) Date of Patent: Sep. 19, 2017

(54) IMAGE RESOLUTION ENHANCEMENT BASED ON DATA FROM RELATED IMAGES

(71) Applicant: Adobe Systems Incorporated, San Jose, CA (US)

(72) Inventors: Ajay Bedi, Noida (IN); Sourabh Gupta, Noida (IN); Saurabh Gupta, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 354 days.

(21) Appl. No.: 14/623,096

(22) Filed: Feb. 16, 2015

(65) Prior Publication Data
US 2016/0239944 A1 Aug. 18, 2016

(51) Int. Cl.
*G06K 9/00* (2006.01)
*G06T 3/40* (2006.01)
*G06K 9/62* (2006.01)
*G06K 9/46* (2006.01)

(52) U.S. Cl.
CPC .......... *G06T 3/4053* (2013.01); *G06K 9/4671* (2013.01); *G06K 9/6201* (2013.01)

(58) Field of Classification Search
CPC ........... G06T 2207/20016; G06T 2207/20021; G06T 2207/20212; G06T 2207/20221; G06T 7/174; G06T 3/4038; G06T 3/4053–3/4092
USPC ................................ 382/284, 294, 298–300
See application file for complete search history.

(56) References Cited

U.S. PATENT DOCUMENTS

| | | | | |
|---|---|---|---|---|
| 2006/0034533 A1* | 2/2006 | Batchvarov | ........... | G06T 3/4053 382/245 |
| 2008/0063277 A1* | 3/2008 | Vincent | ............. | G06K 9/00463 382/182 |
| 2009/0022403 A1* | 1/2009 | Takamori | ............. | H04N 19/139 382/195 |
| 2009/0202169 A1* | 8/2009 | Hayashi | ................ | G06T 3/4092 382/264 |
| 2009/0297063 A1* | 12/2009 | Camp, Jr. | ............. | G06T 3/4053 382/294 |
| 2010/0097398 A1* | 4/2010 | Tsurumi | ................. | H04N 5/144 345/634 |
| 2010/0141823 A1* | 6/2010 | Tsunekawa | ........... | G06T 3/4053 348/333.12 |
| 2010/0296140 A1* | 11/2010 | Zahnert | ................. | G06T 3/4038 358/505 |
| 2011/0064327 A1* | 3/2011 | Dagher | ................... | G06T 5/004 382/263 |

(Continued)

*Primary Examiner* — Wesley Tucker
(74) *Attorney, Agent, or Firm* — Wolfe-SBMC

(57) ABSTRACT

Techniques for image resolution enhancement based on data from related images are described. In one or more implementations, a cropped image and each related image from a set of the related images are divided into blocks that each include a subset of pixels. In at least some implementations, the blocks in the related images have features that match features of respective counterpart blocks in the cropped image. Then, blocks in the related images that have a relatively higher resolution than the respective counterpart blocks in the cropped image are determined. Based on this determination, one or more of the counterpart blocks in the cropped image are replaced with respective blocks from the related images to enhance the image resolution of at least a portion of the cropped image.

20 Claims, 13 Drawing Sheets

(56) References Cited

U.S. PATENT DOCUMENTS

| | | | | |
|---|---|---|---|---|
| 2011/0081094 A1* | 4/2011 | Damkat | ................ | G06T 3/4053 |
| | | | | 382/254 |
| 2015/0319363 A1* | 11/2015 | Furukawa | ............. | G06T 3/4053 |
| | | | | 348/239 |
| 2016/0247257 A1* | 8/2016 | Cheung | ..................... | G06T 5/50 |
| 2016/0292838 A1* | 10/2016 | Kobayashi | ................ | G06T 5/50 |

* cited by examiner

IMAGE RESOLUTION ENHANCEMENT BASED ON DATA FROM RELATED IMAGES

BACKGROUND

Many techniques exist for editing images, such as cropping and/or resizing an image. When editing images, a user may crop the image and then enlarge the cropped portion of the image, such as to a size of the original image. When the image is cropped, various pixels outside of the crop selection are discarded, thereby reducing the size of the image. In other situations, the image can simply be resized to a smaller size, and various techniques are utilized to select which pixels are to be discarded to avoid sacrificing image quality.

By enlarging the image, however, pixels are added to the image. Enlarging the image should show additional details, similar to zooming in to the image. However, these additional details are generally unknown. Therefore, conventional techniques attempt to predict which pixels to add, but generally a larger, more detailed version of what the image should look like remains unknown. A substantial enlargement of the image, using conventional techniques, generally results in visual degradation of image quality of the image (e.g., pixilation and/or blurring). Accordingly, a high resolution image that is cropped and then resized to an original size of the image can result in a low resolution image, which is generally undesirable.

SUMMARY

When a high resolution image is cropped and the cropped image is enlarged, the enlarged version of the cropped image can become pixilated. Similarly, if an image that currently is a lower resolution image is resized to a larger size, the image can become pixilated. Pixilation can occur when an image is enlarged to a point where individual pixels of the image become visually discernible, and further detail generally cannot be resolved. A common result of pixilation is image blur.

Techniques for image resolution enhancement are described. For example, when a user goes on a vacation, the user may capture multiple photos, some of which may include the same persons, objects, and/or scenes, or at least portions of the same persons, objects, and/or scenes. Portions of these related images can then be utilized to augment the image resolution of one of the related photos, such as an enlarged version of a cropped photo or a relatively lower resolution photo.

In one or more implementations, the multiple photos can be filtered to identify a subset of the photos that are related to the cropped photo and which may be good candidates for high resolution image blocks in comparison to the cropped photo. The related photos can be divided into blocks and analyzed to determine the blocks that have a relatively higher resolution than respective counterpart blocks in the cropped photo. Then, the relatively higher resolution blocks from the related photos can be extracted and used to replace the counterpart blocks in the cropped photo to enhance the image resolution of corresponding portions of the cropped image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference is made interchangeably to single or plural forms of the entities in the discussion.

DETAILED DESCRIPTION

Overview

Conventional techniques used for cropping and enlarging an image generally result in an enlarged, pixilated version of the cropped image. Generally, these conventional techniques predict pixels to add to the image, but these added pixels do not necessarily add further detail to the image to resolve the pixilation.

Techniques involving image resolution enhancement are described. In the following discussion, a variety of different implementations are described that involve enhancing image resolution of an image based on data from related images. In one example, a cropped image and each of the related images are divided into blocks that each include a subset of pixels. In at least some implementations, the blocks in the related images have features that match features of respective counterpart blocks in the cropped image. Then, blocks in the related images that have a relatively higher resolution than the respective counterpart blocks in the cropped image are determined. Based on this determination, one or more of the counterpart blocks in the cropped image are replaced with respective blocks from the related images to enhance the image resolution of at least a portion of the cropped image.

Accordingly, a relatively low resolution image can be converted into a relatively high resolution image by replacing portions of the low resolution image with portions from a relatively high resolution image that has matching features. Consider an example where a user Braden takes several photos of his friend Sasha while fishing at a lake. Subsequently, Braden edits one of the photos by cropping the photo down to just Sasha's face and then enlarging the cropped portion. Substantially enlarging the cropped portion of the photo can result in pixilation of the photo. However, using the techniques described herein, the pixilated version of the cropped photo can be converted into a relatively high resolution photo by replacing various pixilated portions of the cropped photo with relatively high resolution portions from other photos from the several photos taken at the lake. For example, the other photos of Sasha may also include non-pixilated, relatively higher resolution versions of her face than that of the enlarged cropped photo. Pixels associated with features from her face and head in those other photos can be extracted and projected onto the cropped photo to enhance the image resolution of the cropped photo, thereby sharpening edges, enhancing color, clarifying details in the cropped photo, and so on.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
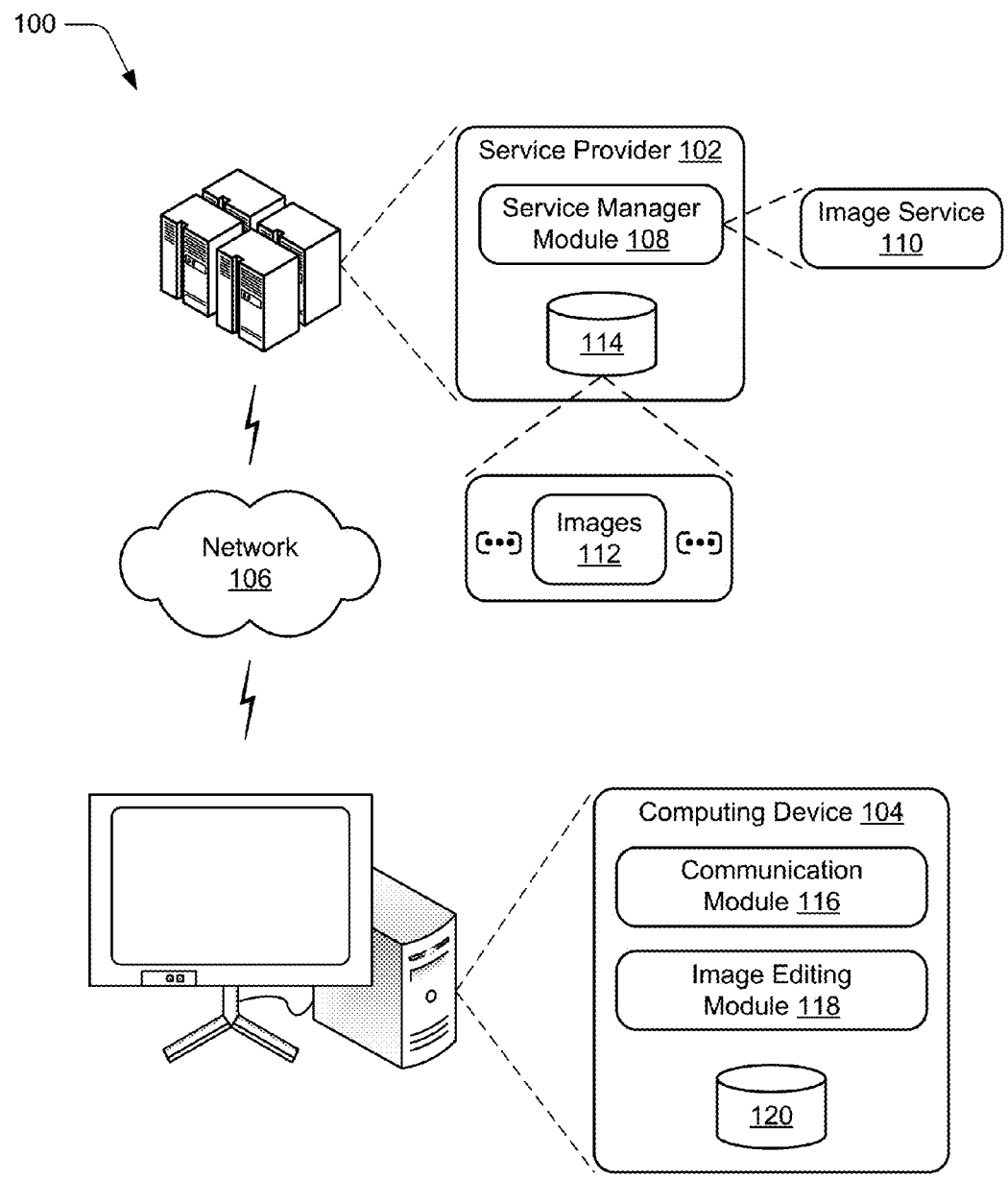
FIG. 1 is an illustration of an environment in an example implementation that is operable to employ techniques for image resolution enhancement based on data from related images.

FIG. 1 is an illustration of an environment 100 in an example implementation that is operable to employ techniques described herein. The illustrated environment 100 includes a service provider 102 and a computing device 104 that are communicatively coupled via a network 106. Functionality represented by the service provider 102 may be performed by a single entity, may be divided across other entities that are communicatively coupled via the network 106, or any combination thereof.

Computing devices that are used to implement the service provider 102 or the computing device 104 may be configured in a variety of ways. Computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 102 utilized by a business to perform operations "over the cloud" as further described in relation to FIG. 13.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The service provider 102 is representative of functionality to provide one or more network-based services. The services are managed by a service manager module 108 to support a variety of different functionality. The services (e.g., web services), for instance, may be configured to support an image service 110. The image service 110 is configured to provide image editing functionality such as, for example, cropping and resizing an image. Additional functionality provided by the image service 110 can include image resolution enhancement using related image content from multiple images 112 stored in storage 114, further discussion of which is provided in more detail below. Although the storage 114 is illustrated as a component of the service provider 102, the storage 114 may alternatively be remote from the service provider 102, or may be a third-party database. The storage 114 may be a single database, or may be multiple databases, at least some of which include distributed data. Thus, a variety of different types of storage mechanisms can be utilized for the storage 114.

In implementations, a user may interact with a computing device 104 having a communication module 116 that is configured to support communication via the network 106, such as with the one or more services of the service provider 102. As such, the communication module 116 may be configured in a variety of ways. For example, the communication module 116 may be configured as a browser that is configured to "surf the web." The communication module 116 may also be representative of network access functionality that may be incorporated as part of an application, e.g., to provide network-based functionality as part of the application, an operating system, and so on. Thus, functionality represented by the communication module 116 may be incorporated by the computing device 104 in a variety of different ways.

As part of the communication supported by the communication module 116, one or more of the images 112 can be uploaded to the storage 114 via the network 106. The images 112 stored in the storage 114 can include images that were captured using an image capturing device of a user of the computing device 104. In implementations, the image capturing device can include a camera that is integrated with the computing device 104, or that is separate from the computing device 104. Additionally, the communication module 116 may be configured to communicate with the image service 110 to initiate the image editing functionality for an image.

In alternative implementations, the image editing functionality can be provided by an image editing module 118 at the computing device 104. For example, the image editing module 118 can be configured to perform a variety of image editing functions, such as cropping, resizing, enhancing color, enhancing contrast, and so on. In addition, the image editing module 118 can be configured to enhance image resolution of an image using related content from multiple images stored in storage 120 at the computing device 104. In at least some examples, the image editing module 118 can be implemented via a mobile application, a desktop application, a plugin, a hosted service, a combination of client and server, or any combination thereof.

Example Implementation

The following discussion describes example implementations of image resolution enhancement that can be employed to perform various aspects of techniques discussed herein. The example implementations may be employed in the environment 100 of FIG. 1, the system 1300 of FIG. 13, and/or any other suitable environment.

Figure 2:
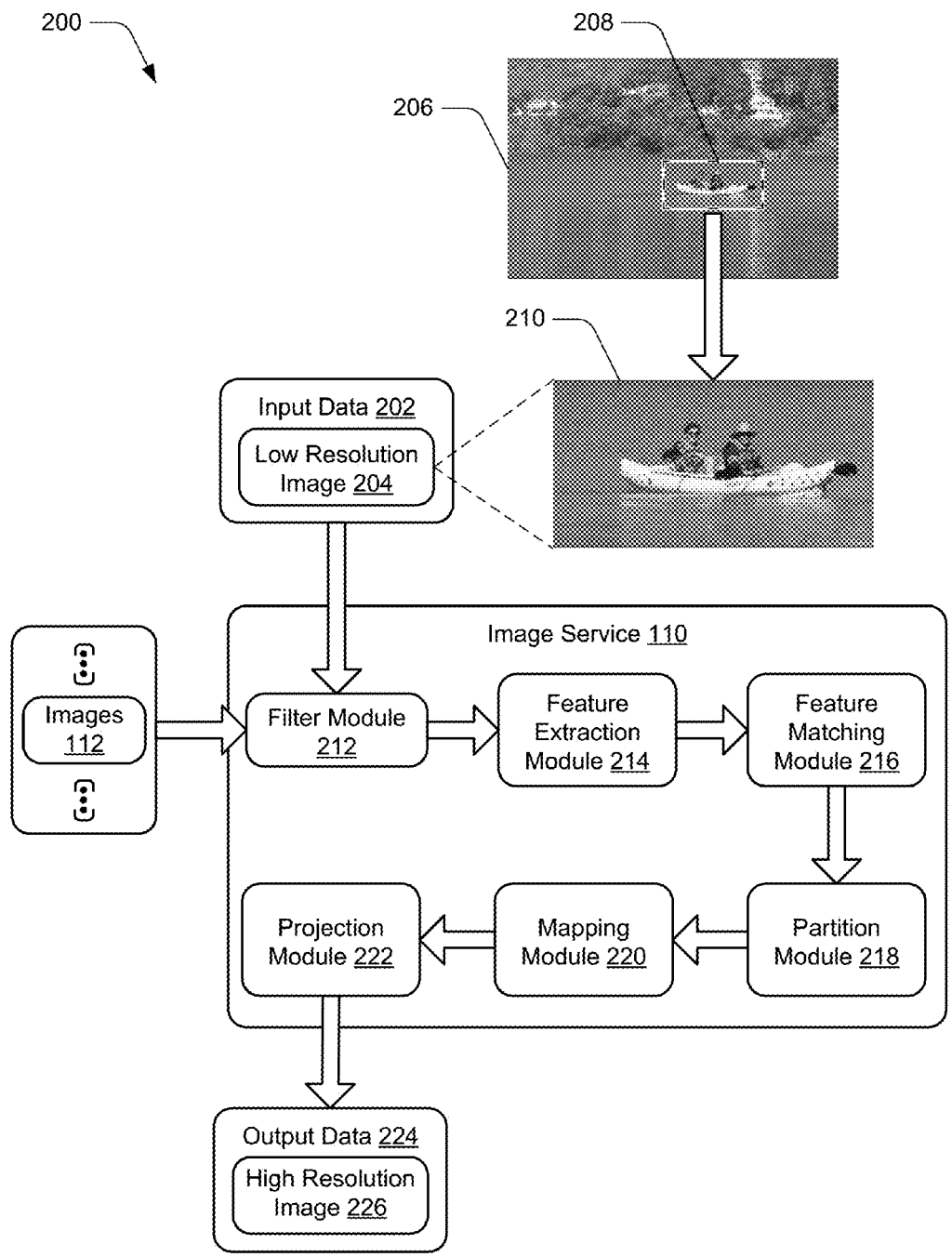
FIG. 2 is an illustration of an example implementation that is operable to employ techniques for image resolution enhancement at an image service.

FIG. 2 is an illustration of an example implementation 200 that is operable to employ techniques for image resolution enhancement based on a set of related images. The illustrated implementation 200 includes an image service, such as image service 110, that represents a web service provided by service provider 102. Alternatively, the functionality provided by the image service can be implemented at a computing device of a user, such as by the image editing module 118 of computing device 104. For purposes of simplicity, this functionality is described herein as being implemented by the image service 110.

In implementations, the image service 110 can receive input data 202, such as a low resolution image 204. In an example, a relatively low resolution image, such as an image having 800 pixels in width and 600 pixels in height, can be a resultant image from cropping and resizing operations performed on a relatively high resolution image, such as an image having 1280 pixels in width and 1024 pixels in height. For instance, a relatively high resolution image 206 can be cropped to create a smaller portion of the image that targets one or more objects in the image. For example, image 206 is a photograph of two people in a boat on a lake. This image 206 is cropped based on crop box 208, which encloses the two people and the boat. The cropping operation removes portions of the image 206 that are outside the crop box 208, and creates a cropped image 210. Additionally, the cropped image 210 is enlarged, which can degrade image quality of the cropped image 210, thereby causing the cropped image 210 to become blurred or pixilated.

The image service 110 includes a variety of components in the form of modules that are configured to perform various operations to enhance the image resolution of an image using data from a set of related images. For example, the image service 110 is illustrated as including a filter module 212, a feature extraction module 214, a feature matching module 216, a partition module 218, a mapping module 220, and a projection module 222. These modules can be utilized by the image service 110 to convert the input data 202, such as the low resolution image 204, into output data 224 that includes a high resolution image 226, based on a subset of images 112 that are related to the input data 202. The images 112 can include a collection of images captured by an image capturing device. In implementations, at least some of the images 112 are captured at or near a same location, or on the same day and approximately the same time of day, such that some of the images 112 include at least a portion of the same objects. The images 112 can be stored in the local storage 120 at the computing device 104, in a portable storage such as a pen drive or flash drive, in the storage 114 of the service provider 102 such as a cloud-based repository (e.g, Facebook™, Instagram™, and so on), in a distributed database, or any combination thereof.

The filter module 212 represents functionality to filter a set of images, such as images 112, to identify a subset of the images 112 that have a high probability of being good candidates for high resolution blocks that will correlate to blocks of the low resolution image 204. In implementations, the filter module 212 is configured to identify which of the images 112 are related to the cropped image 210 based on metadata associated with the cropped image 210. For example, this metadata can be used to identify which of the images 112 have matching or similar metadata.

Some examples of metadata that can be used to locate related images can include, but are not limited to, capture date and/or time representing when the original version of the cropped image 210 (e.g., image 206) was captured, or global position system (GPS) information associated with a location where the image 206 was captured. In implementations, images that are captured on the same day and/or near the same time of day may be assumed to include the same people, scenes, or other objects, or at least portions of the same people, scenes, or other objects. Additionally or alternatively, images that are captured near a same location can include at least portions of the same people, scenes, or other objects. Alternatively, the filter module 212 can utilize the entire set of images 112 if no metadata is found for the cropped image 210. Further discussion of example implementations of the modules utilized by the image service 110 are described with reference to FIGS. 3-9.

Figure 3:
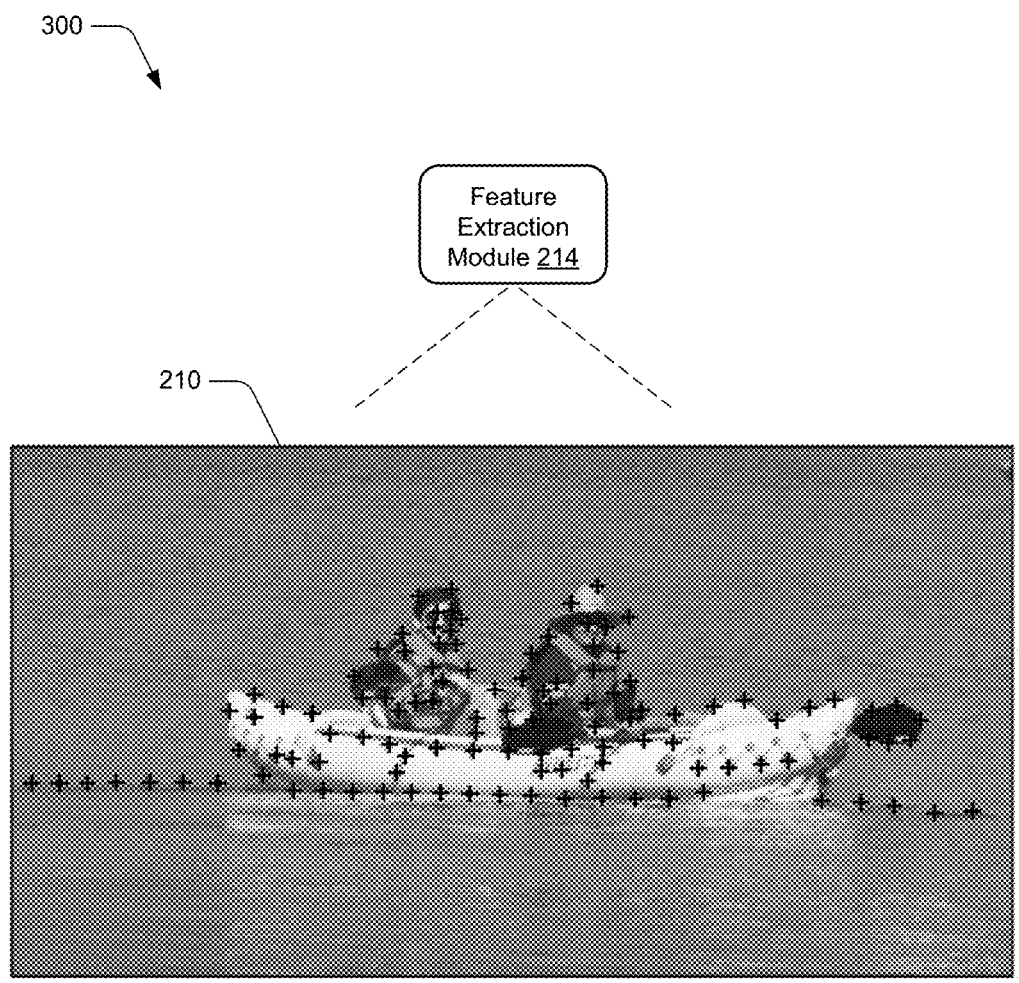
FIG. 3 is an illustration of an example implementation of functionalities associated with a feature extraction module.

FIG. 3 illustrates an example implementation 300 of functionalities represented by the feature extraction module 214. The feature extraction module 214 is configured to extract or otherwise detect features from the cropped image 210 and from the related images identified by the filter module 212. Generally, there are various interesting points that uniquely represent an object in an image, and these points can be extracted to provide a "feature" description of that object. This feature description can then be used to locate the object in other images containing a variety of other objects. Various considerations are taken into account when extracting these features and determining how to record such features.

One example feature extraction technique includes a scale invariant feature transform (SIFT) technique that is not generally affected by various complications experienced by other techniques, such as object scaling and rotation. The SIFT technique is also substantially resilient to effects of "noise" in the image. Accordingly, the SIFT technique, for image feature extraction, transforms an image into a large collection of local feature vectors that are each invariant to scaling, rotation, and/or translation of the image. In the example illustrated in FIG. 3, the cropped image 210 includes a plurality of indicators, illustrated as crosses, that identify points of interest associated with various features included in the cropped image 210. For example, features of the boat, features of the people in the boat, and where the boat intersects the water of the lake are all identified by the indicators as points of interest in the cropped image.

Figure 4:
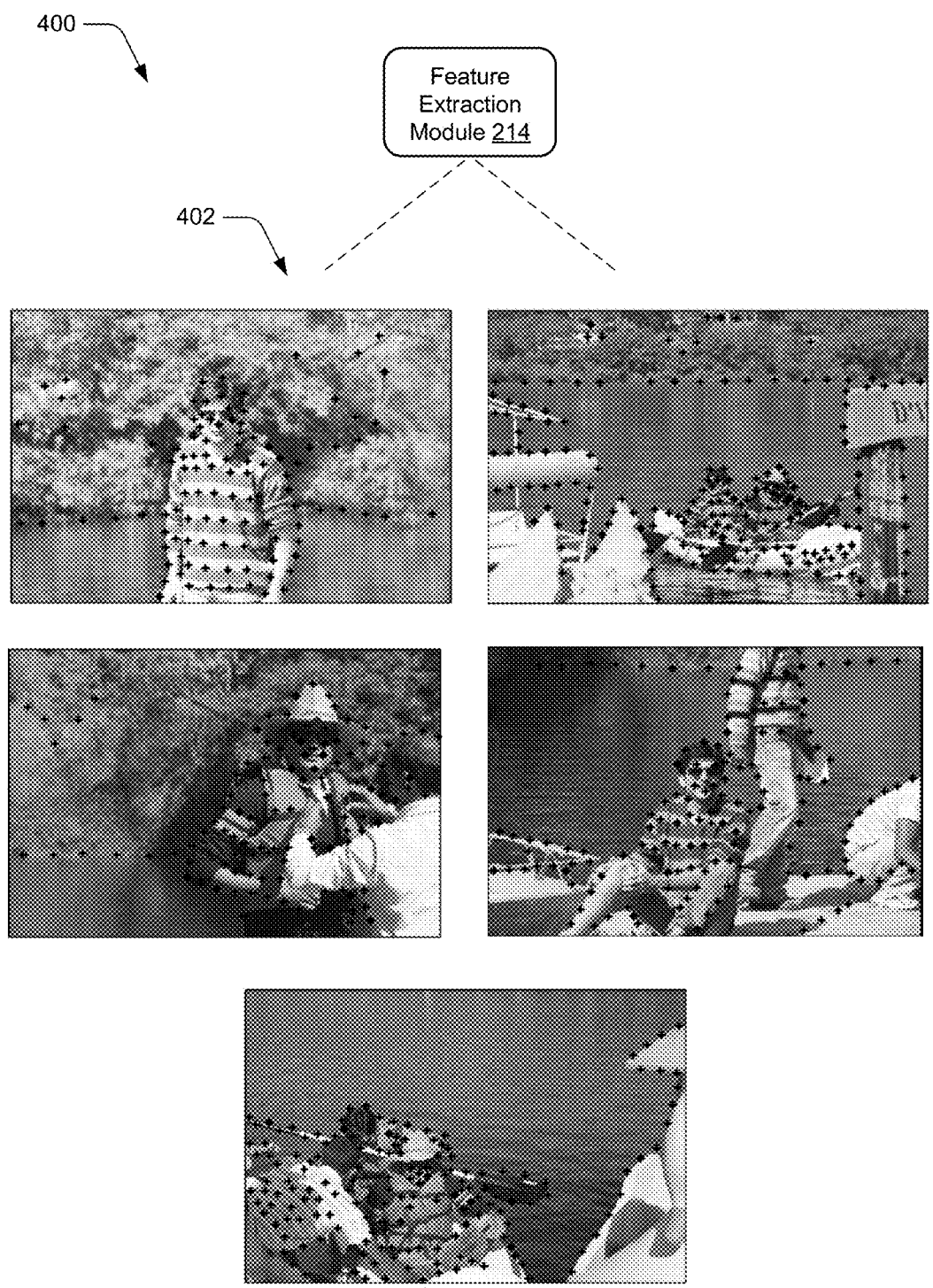
FIG. 4 is an illustration of an additional example implementation of functionalities associated with the feature extraction module.

In addition, FIG. 4 illustrates an example implementation 400 of functionalities represented by the feature extraction module 214 in relation to a set of related images 402 that were identified by the filter module 212 from the images 212. Similar to extracting features from the cropped image 210, the feature extraction module 214 is also configured to extract various features from each of the related images. For example, FIG. 4 illustrates five different images, representing the set of related images 402, that are related to the cropped image 210. These related images 402 collectively include the same people, boat, and at least portions of the same scenery as that of the cropped image 210. In the illustrated example, each of the related images 402 includes indicators, illustrated as crosses, that identify points of interest representing the various features identified by the feature extraction module 214. In one embodiment, the feature extraction module uses the same feature extraction technology for the images 212 as used for the cropped image 210.

The features extracted from the cropped image 210 can then be matched to the features extracted from the related images 402. The image service 110 can implement this functionality via the feature matching module 216.

Figure 5:
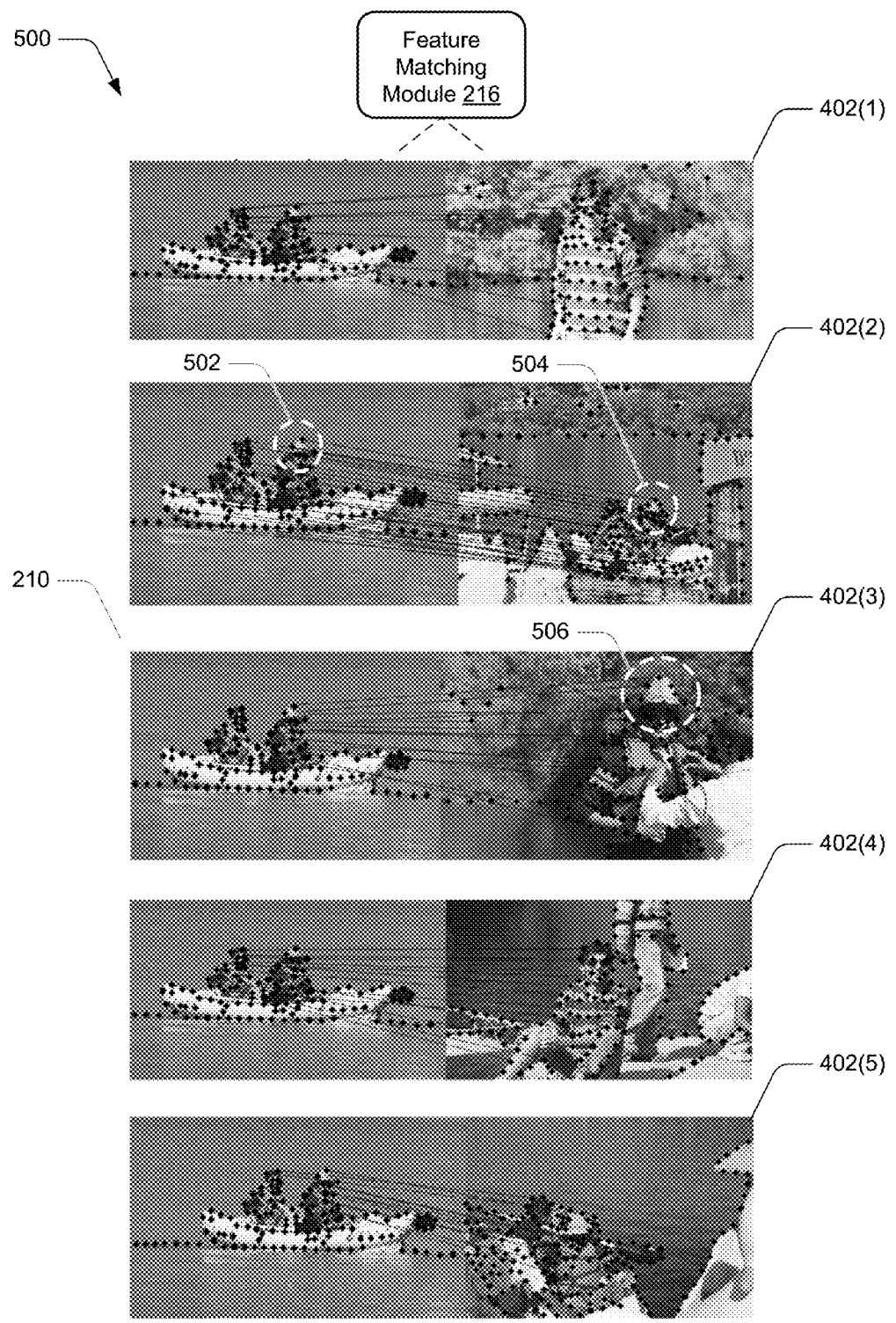
FIG. 5 is an illustration of an example implementation of functionalities associated with a feature matching module.

FIG. 5 illustrates an example implementation 500 of functionalities represented by the feature matching module 216. The feature matching module 216 is configured to identify which features in the related images 402 match features from the cropped image 210. For example, FIG. 5 illustrates features from the cropped image 210 being matched to features in various related images 402(1)-(5). In at least some implementations, a particular feature in the cropped image 210 can be matched to a same or similar feature in a single image from the related images 402, or matched to multiple images from the related images 402. Using the SIFT technique, for example, the features extracted from the cropped image are compared to the features extracted from the related images to identify features with matching or similar local feature vectors. Alternatively, the feature matching module 216 may fail to identify any matching features in any of the related images 402.

In implementations, however, at least some of the related images 420 may have features that match the features in the cropped image 210, but may not be useful if the features in the related images 402 do not have a relatively higher image resolution in comparison to the features of the cropped image 210. For example, the cropped image 210 includes a man wearing a hat 502 that is matched to related images 402(2), (3), and (5). However, the hat 504 in related image 402(2) may not be useful because it is substantially the same size as the hat 502 in the cropped image 210 and is not likely to have a relatively higher image resolution in comparison to the hat 502 in the cropped image 210. Conversely, the hat 506 in related image 402(3) may be useful because its viewing size indicates that it may have a relatively higher resolution than the hat 502 in the cropped image 210. In implementations, the viewing size is determined based on a width and a height of a rectangular portion of each image containing the hat. The image having the largest scale with respect to hat 502 in the cropped image 210 is selected. For example, the width and height of hat 506 in image 403(3) is determined to be the relatively largest, and is therefore selected.

Consequently, portions of the related images 402 are filtered to identify useful portions that can be used to enhance the image resolution of the cropped image 210. Accordingly, the image service 110 can implement a partition module 218 and a mapping module 220 to identify useful portions of the related images, and effectively provide a second filtering step to further reduce the data from the related images to only the useful data.

Figure 6:
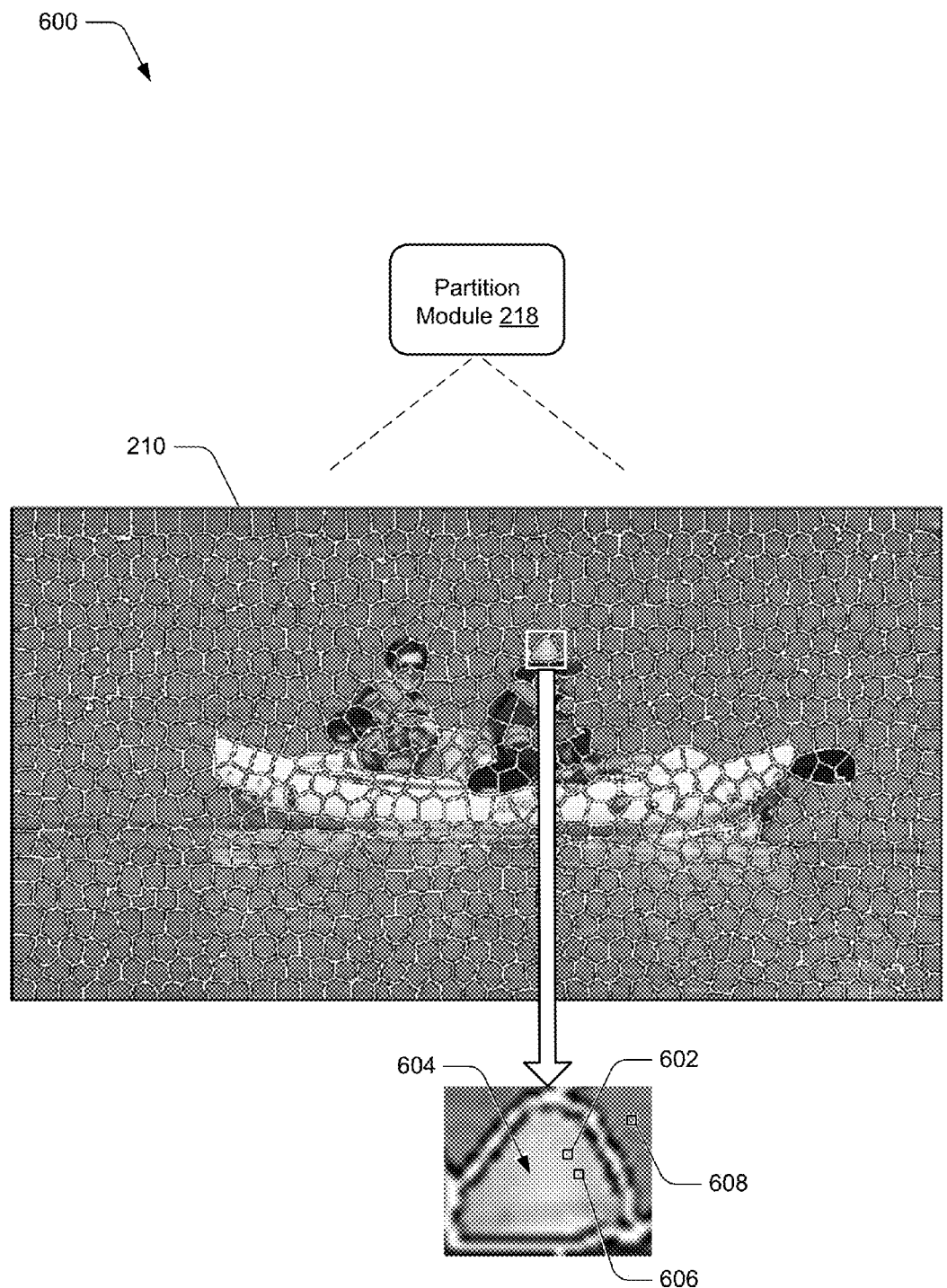
FIG. 6 is an illustration of an example implementation of functionalities associated with a partition module.

FIG. 6 illustrates an example implementation 600 of functionalities associated with the partition module 218. The partition module 218 is configured to divide the cropped image 210 and each of the related images 402 into blocks. In the illustrated example, the cropped image 210 is divided into a plurality of blocks. In implementations, the blocks can be generated around the matched features or at least portions of the matched features in the image. In at least one approach, the blocks can be generated in association with one or more edges of an object to enable the object edges to be differentiated. Additionally or alternatively, substantially equally distributed coordinates can be used to select seed pixels. These seed pixels can then be used as starting points for generating the blocks. For example, seed pixel 602 can be used as a starting point to generate block 604. Additional pixels that are proximate to each seed pixel can be grouped with a seed pixel based on pixel intensity difference in relation to the seed pixel. For instance, if pixel density of an additional pixel is less than a threshold when compared to the seed pixel, then that additional pixel can be grouped with the seed pixel to generate a block. In the illustrated example, pixel 606 is grouped with seed pixel 602 based on the pixel density of the pixel 606 being similar to, or less than a threshold when compared to, the pixel density of the seed pixel 602. However, the pixel density of pixel 608 is greater than the threshold, and thus the pixel 608 is not grouped with the seed pixel 602 to form the block 604. The pixel 608 would instead be grouped with another seed pixel to generate another block. Accordingly, the blocks are generated into various shapes and sizes that each include a subset of pixels from the image.

Figure 7:
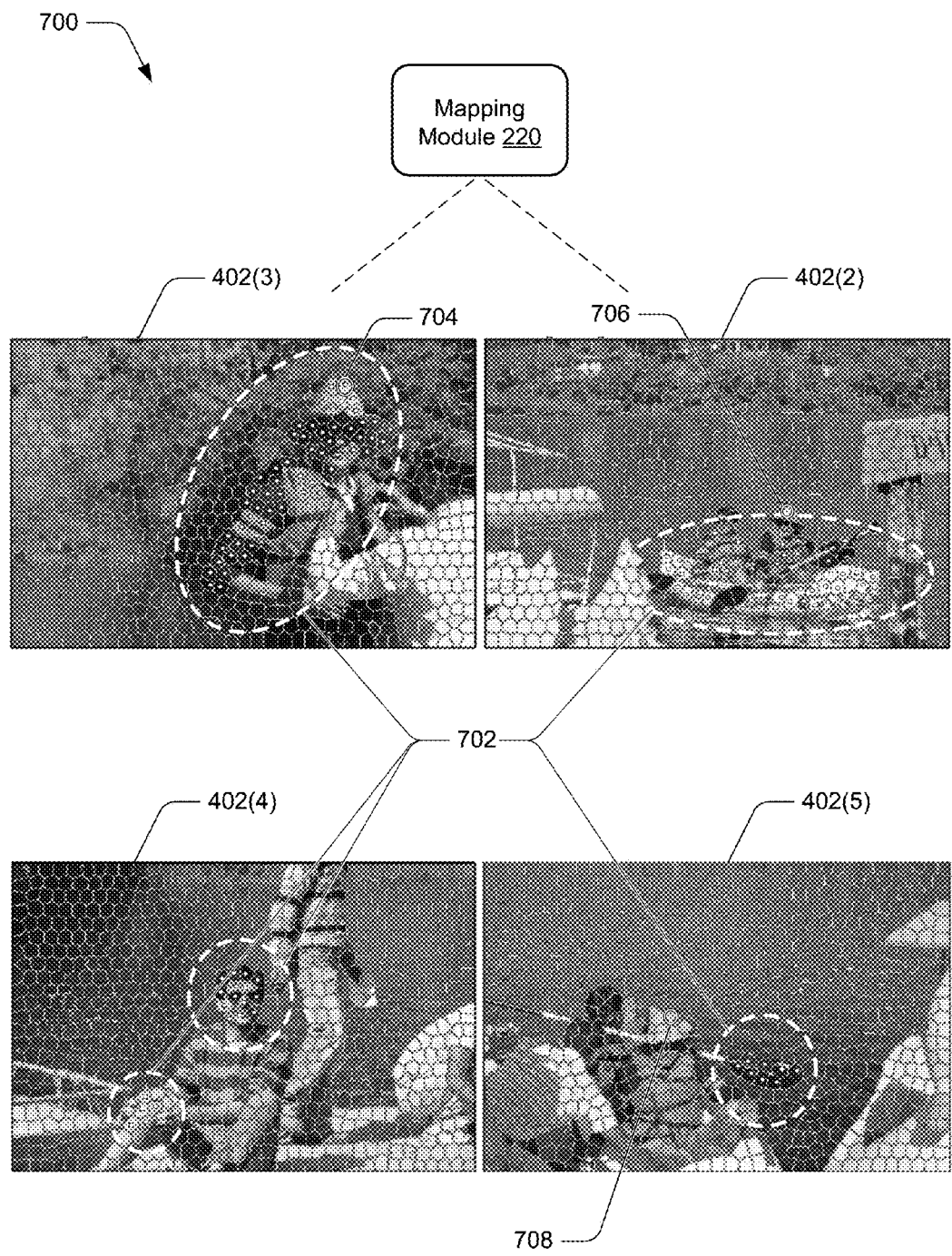
FIG. 7 is an illustration of an example implementation of functionalities associated with a mapping module.

FIG. 7 illustrates an example implementation 700 of functionalities associated with the mapping module 220. The mapping module 220 is configured to determine which blocks in the related images 402 may be useful to enhance the image resolution of the cropped image 210. In the illustrated example, blocks from related images 402(2)-(5) are selected to replace counterpart blocks in the cropped image 210. For purposes of illustration, the selected blocks are identified by white dots and located within areas 702. The blocks from the related images 402 can be selected in a variety of ways.

In one example, if a block from the cropped image 210 is mapped to a block in only one of the related images 402, then a comparison can be made between a size of the block from the one related image 402 and a size of the block from the cropped image 210. If, based on the comparison, a determination is made that the size of the block from the one related image 402 is greater than the block from the cropped image 210 by at least a threshold amount (e.g., 150%), then that block from the related image 402 can be selected. Using a threshold amount for relative sizes of blocks from the related images 402 in comparison to counterpart blocks from the cropped image 210, can provide an indication as to whether the blocks from the related images 402 have a relatively higher image resolution than that of the counterpart blocks from the cropped image 210.

In one or more implementations, blocks from multiple different related images 402 are mapped to the same counterpart block in the cropped image 210. In order to determine which of the mapped blocks to select for extraction, the mapping module 220 is configured to compare the mapped blocks to one another based on a number of features in each mapped block that match features in the counterpart block from the cropped image 210. A mapped block that includes a relative maximum number of features that match the features in the counterpart block from the cropped image 210 is selected for extraction. In addition or in the alternative, the selection can be based on block size. For example, a mapped block, such as block 704, can be selected for extraction based on the mapped block having a relatively largest size in comparison to respective sizes of the other mapped blocks from the multiple different related images 402, such as blocks 706 and 708.

Figure 8:
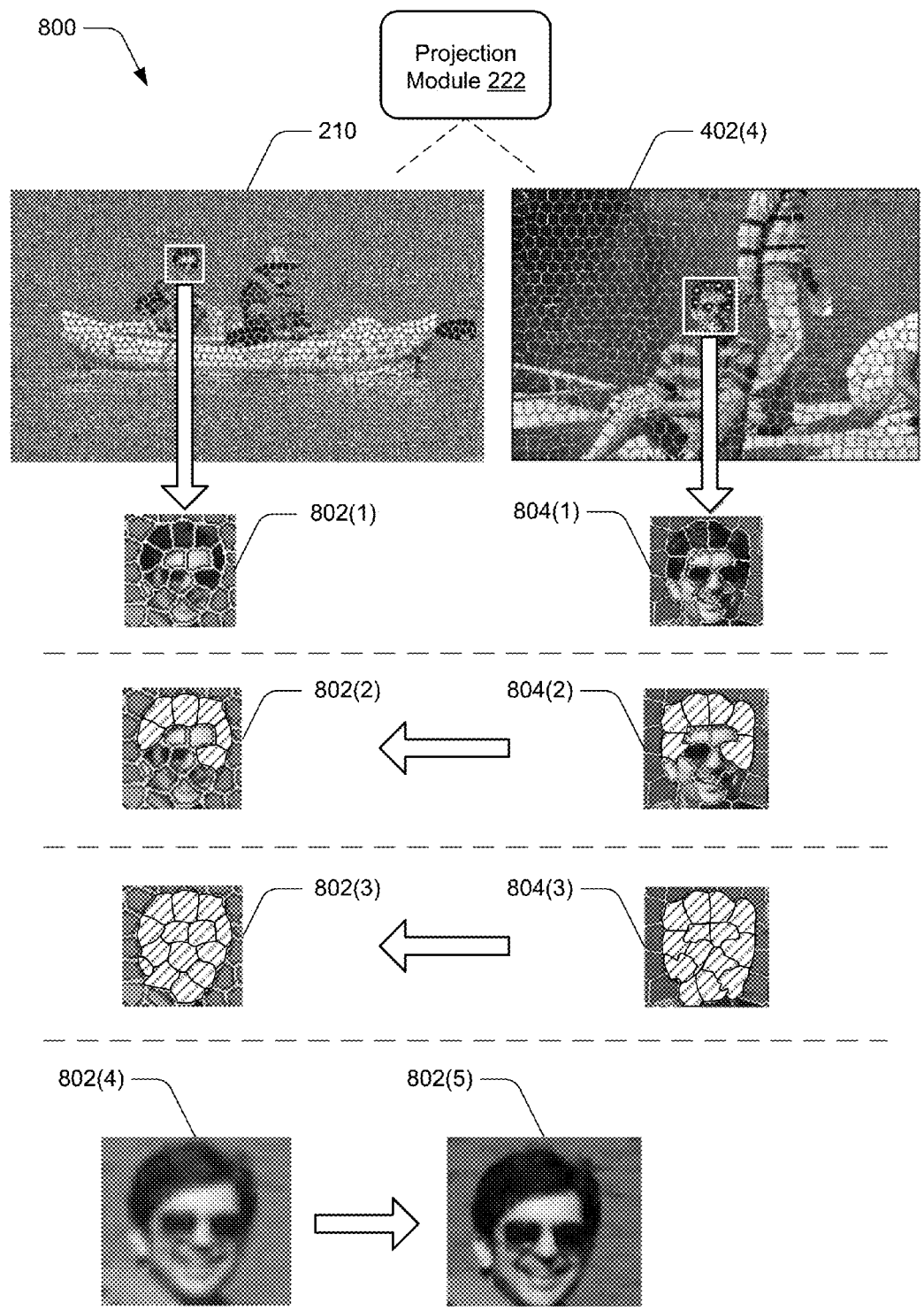
FIG. 8 is an illustration of example implementation of functionalities associated with a projection module.

FIG. 8 illustrates an example implementation 800 of functionality associated with the projection module 222. The projection module 222 is configured to extract pixels from the selected blocks in the related image 402 and project those pixels onto the counterpart blocks in the cropped image 210. For example, in the cropped image 210, the head of the person on the left has been mapped to related image 402(4), as illustrated by magnified portions 802(1) and 804(1), respectively. For each block that is to be replaced in the cropped image 210, a projection matrix is generated based on the features in that block. The projection matrix may represent locations associated with features from the block in the cropped image 210 where metrics and points associated with the block are calculated. In implementations, the projection matrix can include an (n×n) square matrix that gives a vector space projection from a field of numbers to a subspace. In at least one example, at least four features from the block in the cropped image 210 can be used to create the projection matrix. Based on the projection matrix, pixels can be extracted from the mapped block in the related image 402 that has a relatively higher image resolution and then projected onto a relatively lower resolution block in the cropped image 210 to fit an original alignment of the pixels in the block from the cropped image 210.

For example, various high resolution blocks in portion 804(1) that make up the head of the person from the related image 402(4) are projected onto counterpart low resolution blocks from portion 802(1) that make up the head of the person from the cropped image 210. In the illustrated example, some of the blocks from portion 804(2) have been extracted and projected onto portion 802(2), as represented by hash marks in the projected blocks. This process may continue as illustrated by the hash marks in portion 804(3) representing the blocks that are extracted and projected onto portion 802(3). Accordingly, an original, lower resolution version 802(4) of the person's head from the cropped image 210 is converted into a relatively higher resolution version 802(5). By combining all of the mapped high resolution portions from the related images, a complete high resolution image can be generated for output.

In some implementations, however, an amount of the data from the related images may be useful to enhance only a portion of the cropped image 210. In this case, the user can be notified of an amount of the cropped image 210 that was successfully enhanced, and provided an option to accept or cancel the enhancement. In one or more implementations, the user can be provided with a preview of the partially enhanced version of the cropped image 210.

Figure 9:
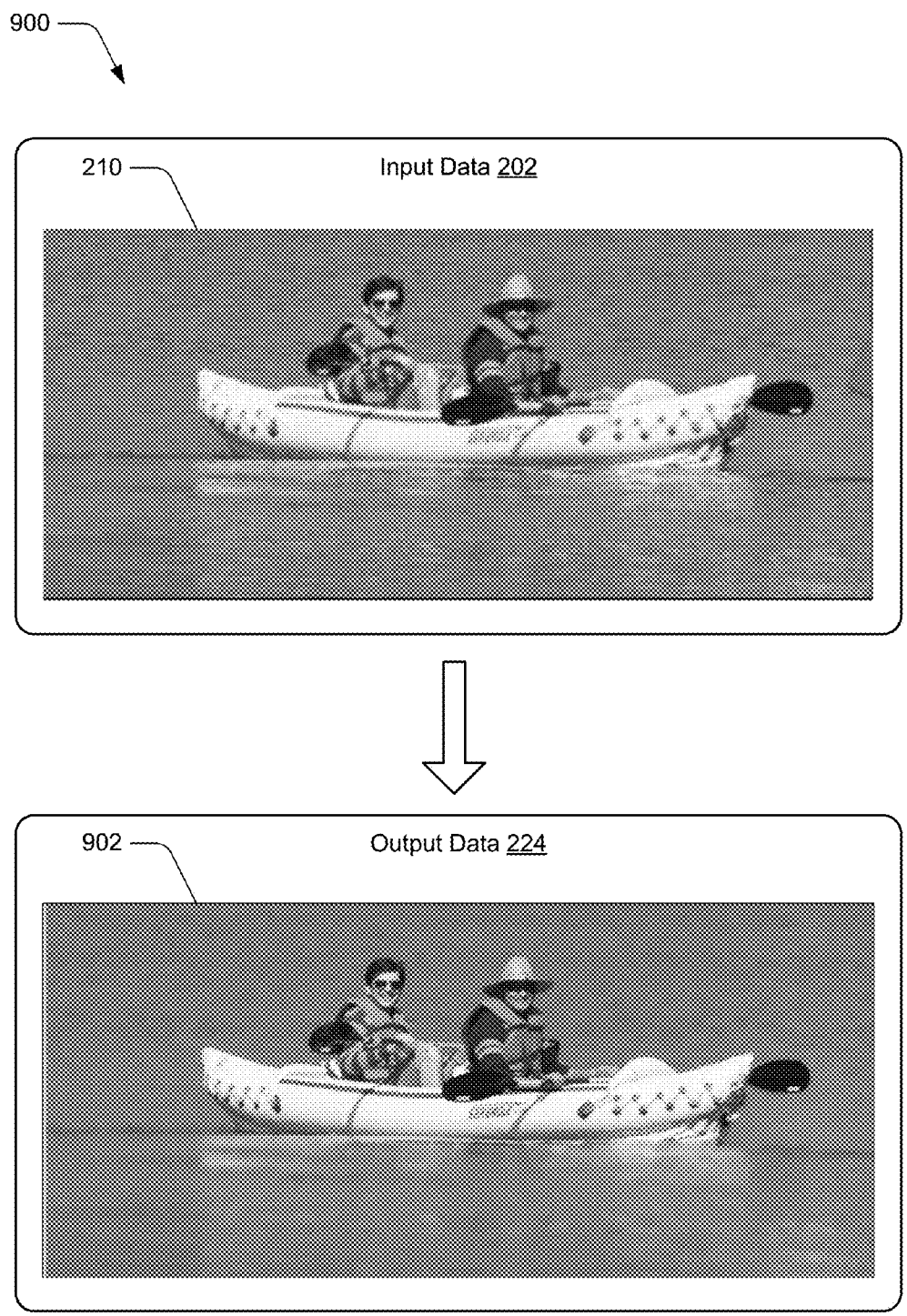
FIG. 9 is an illustration of an example implementation of image resolution enhancement techniques employed on input data with resulting output data.

FIG. 9 illustrates an example implementation 900 of image resolution enhancement techniques employed using the image service 110. In the illustrated example, the input data 202 includes the relatively low resolution image 204. As described above, this image may have been cropped from a relatively higher resolution image and then enlarged, which resulted in the reduction of the image quality (e.g., image resolution) of the cropped image 210. By utilizing the set of related images, such as related images 402, the image service 110 can enhance the image resolution of the cropped image 210 and provide output data 224 that includes a relatively high resolution image 902. In comparison to the cropped image 210, the relatively high resolution image 902 can include sharp focus or fine detail that was lacking in the cropped image 210.

Example Procedures

The following discussion describes techniques for image resolution enhancement based on a set of related images that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example implementation 200 of FIG. 2.

Figure 10:
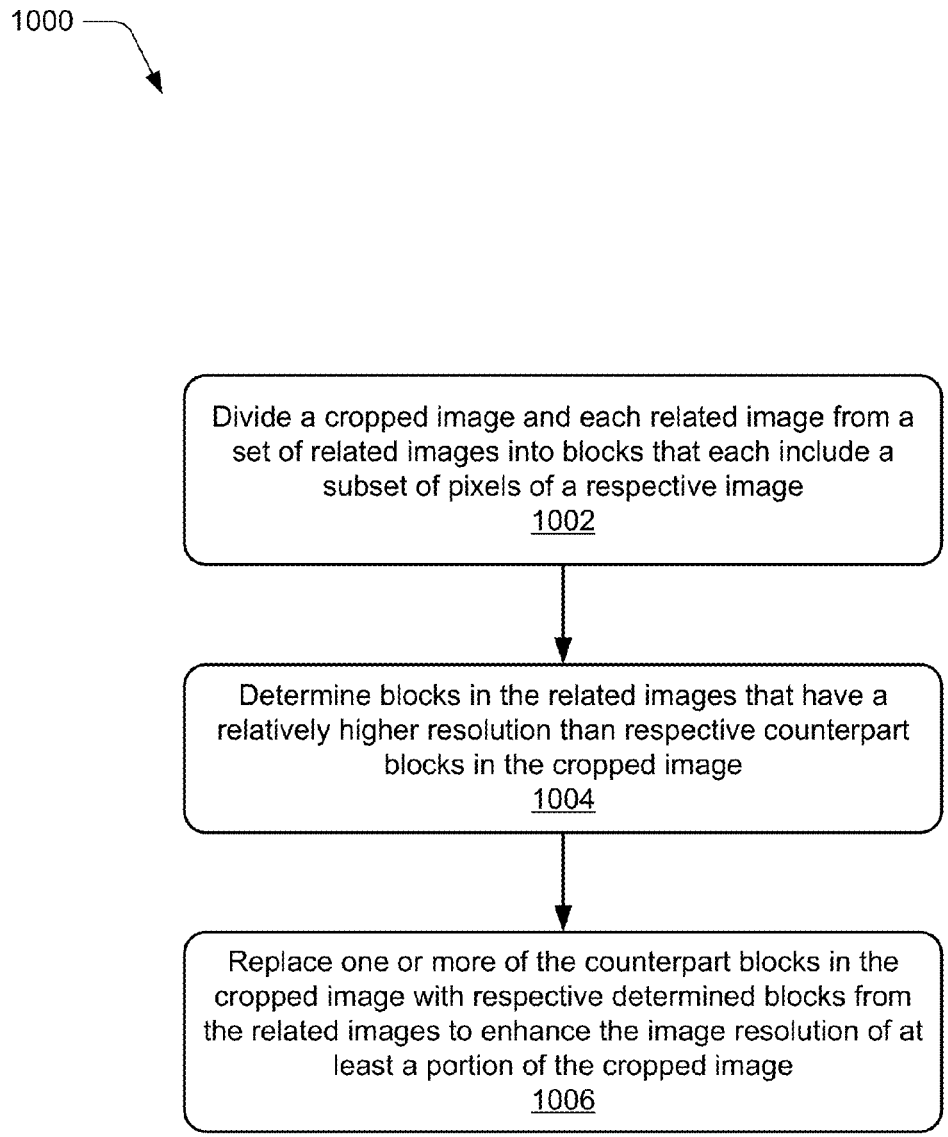
FIG. 10 is a flow diagram depicting a procedure in an example implementation in which techniques for image resolution enhancement are employed.

FIG. 10 is a flow diagram depicting a procedure 1000 in an example implementation in which techniques for image resolution enhancement are employed. A cropped image and each related image from a set of related images are divided into blocks that each include a subset of pixels of a respective image (block 1002). For example, various pixels in an image can be selected as seed pixels that can be used as starting points to generate the blocks. In at least one implementation, a block can be generated by grouping pixels that are proximate to the seed pixel based on one or more parameters, such as pixel density or a threshold level of pixel intensity difference between a proximate pixel and the seed pixel.

Blocks in the related images that have a relatively higher resolution than respective counterpart blocks in the cropped image are determined (block 1004). For example, a block in a related image can be selected based on a size comparison between that block and the counterpart block. If the viewing size of the block in the related image is relatively larger than that of the counterpart block in the cropped image by a threshold amount, then the block in the related image is likely to have a relatively higher image resolution than that of the counterpart block in the cropped image. In contrast, if the size comparison between the block and the counterpart block does not exceed the threshold, then the block from the related image may not be useful to enhance the image resolution of the counterpart block in the cropped image.

One or more of the counterpart blocks in the cropped image are replaced with respective determined blocks from the related images to enhance the image resolution of at least a portion of the cropped image (block 1006). For example, pixels from a block in the related image 402 are extracted and projected onto the counterpart block in the cropped image 210. In implementations, a projection matrix associated with the counterpart block in the cropped image 210 is used to establish an original alignment of features that are included in the counterpart block. This projection matrix can then be used when projecting the pixels from the block in the related image 402 onto the counterpart block in the cropped image 210.

Figure 11:
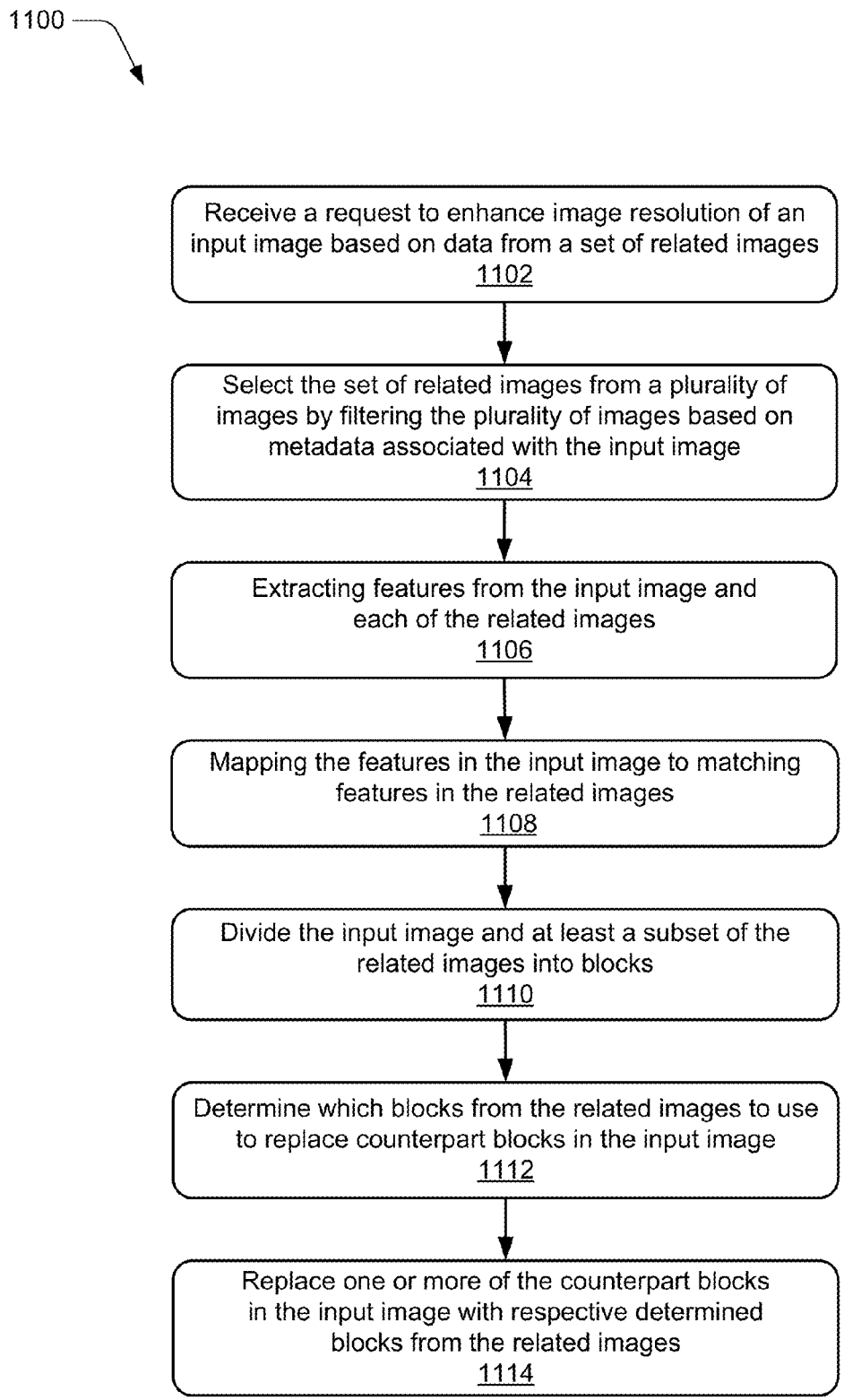
FIG. 11 is a flow diagram depicting a procedure in an example implementation in which techniques for image resolution enhancement are employed.

Having discussed a general procedure with respect to FIG. 10, consider now a discussion of FIG. 11, which is a flow diagram depicting a procedure 1100 in an example implementation in which techniques for image resolution enhancement are employed. A request is received to enhance image resolution of an input image based on data from a set of related images (block 1102). In one or more implementations, the request may be received from a client device over a network. Alternatively, the request may be received at a client device, such as computing device 104 that includes an image editing module 118, capable of performing the requested image resolution enhancement. In addition, the request can include the input image that is to be enhanced, or provide a location in a database or local storage to enable the service manager module 108 or the image editing module 118 to retrieve the input image.

A set of related images is selected from a plurality of images by filtering the plurality of images based on metadata associated with the input image (block 1104). In one or more implementations, the metadata associated with the input image can include information such as the date and/or time that the input image was captured by an image capturing device. Additionally or alternatively, the information can include GPS coordinates associated with a location where the input image was captured. Accordingly, the plurality of images can be filtered based on the metadata to identify a subset of the images that are related to the input image and which are likely to include at least a portion of the same people, scenery, and/or objects as those that are in the input image.

Features from the input image and each of the related images are extracted (block 1106). This step can be performed in any suitable way, examples of which are described above. Once the features are extracted from each of the related images, these features can be compared to the features extracted from the input image. Features in the input image are mapped to matching features in the related images (block 1108). By identifying matching features in the related images, the number of images in the set of related images can be reduced. Accordingly, this step can act as a second filtering step to reduce the amount of data to process. For instance, the first filtering step identified the set of related images from the plurality of images based on the metadata associated with the input image, while this second filtering step is used to identify relevant images from the set of related images.

The input image and at least a subset of the related images are divided into blocks (block 1110). This step can be performed in any suitable way, examples of which are described above. Once the blocks are generated, a determination is made as to which blocks from the related images to use to replace counterpart blocks in the input image (block 1112). A variety of different parameters can be used to make this determination, examples of which are described above. In implementations, the blocks from the related images that are to be used to replace the counterpart blocks in the input image have a relatively higher image resolution than that of the counterpart blocks. Accordingly, the determination is directed at identifying particular blocks that may be useful in enhancing the image resolution of the counterpart blocks.

Once useful blocks are determined, one or more of the counterpart blocks in the input image are replaced with respective determined blocks from the related images (block 1114). This step can be performed in any suitable way, examples of which are described above. Additionally, further discussion of this step is provided below in additional detail with respect to FIG. 12.

Figure 12:
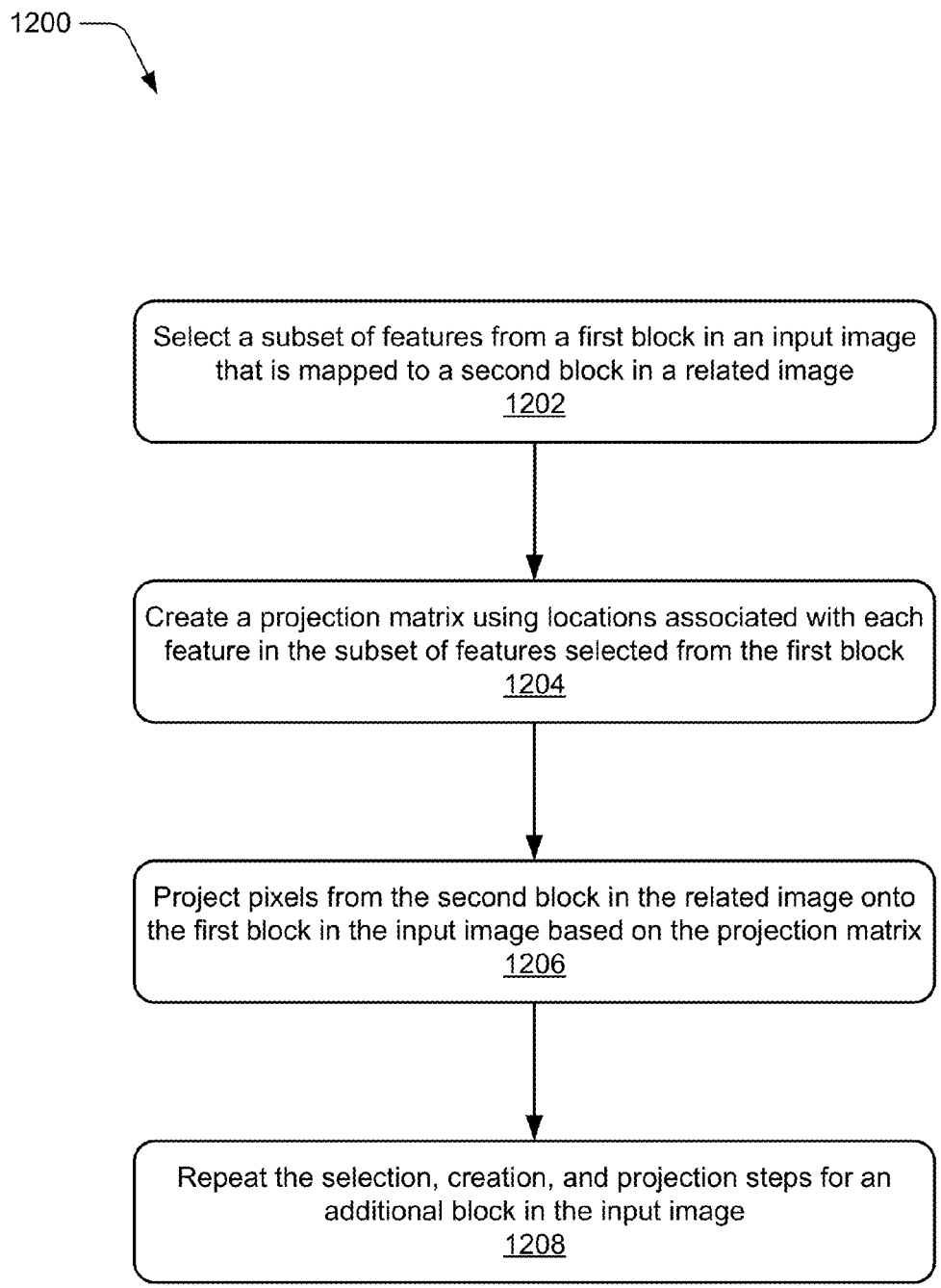
FIG. 12 is a flow diagram depicting a procedure in an example implementation in which techniques for projecting pixels from a first image block onto a second image block are employed.

FIG. 12 is a flow diagram depicting a procedure 1200 in an example implementation in which techniques are employed to replace one or more counterpart blocks in the input image with respective blocks from the related images. A subset of features are selected from a first block in an input image that is mapped to a second block in a related image (block 1202). In one or more implementations, the first block is mapped to the second block based on various features in the first block that are mapped to similar features in the second block.

A projection matrix is created using locations associated with each feature in the subset of features selected from the first block (block 1204). This step can be performed in any suitable way, examples of which are described above. The projection matrix is used to establish an alignment of the features in the first block in the input image. Although any number of features can be selected from the first block to generate the projection matrix, the projection matrix can be optimized based on a selection of four features from the first block.

Pixels from the second block in the related image are projected onto the first block and the input image based on the projection matrix (block 1206). By using the projection matrix, the original alignment of the features in the first block can be maintained while projecting pixels from a relatively higher image resolution block onto the first block.

The selection, creation, and projection steps (blocks 1202-1206) are repeated for an additional block in the input image (block 1208). For example, the steps can be repeated for each block in the input image to enhance the overall image resolution of the input image. Alternatively, the steps can be repeated for one or more blocks in the input image to enhance the image resolution of only a portion of the input image, rather than the entire input image. For example, a person's facial features in an image can be converted to a relatively higher image resolution while the image resolution of surrounding scenery in the image may remain at a relatively lower image resolution. In at least some implementations, the user can be prompted to accept or cancel the image resolution enhancement of the input image. In one example, if the input image is only partially enhanced based on insufficient data from the related images to enhance the image resolution of the entire input image, the user can be provided a preview of the partially enhanced input image and a request to accept or cancel the partial enhancement.

Example System and Device

Figure 13:
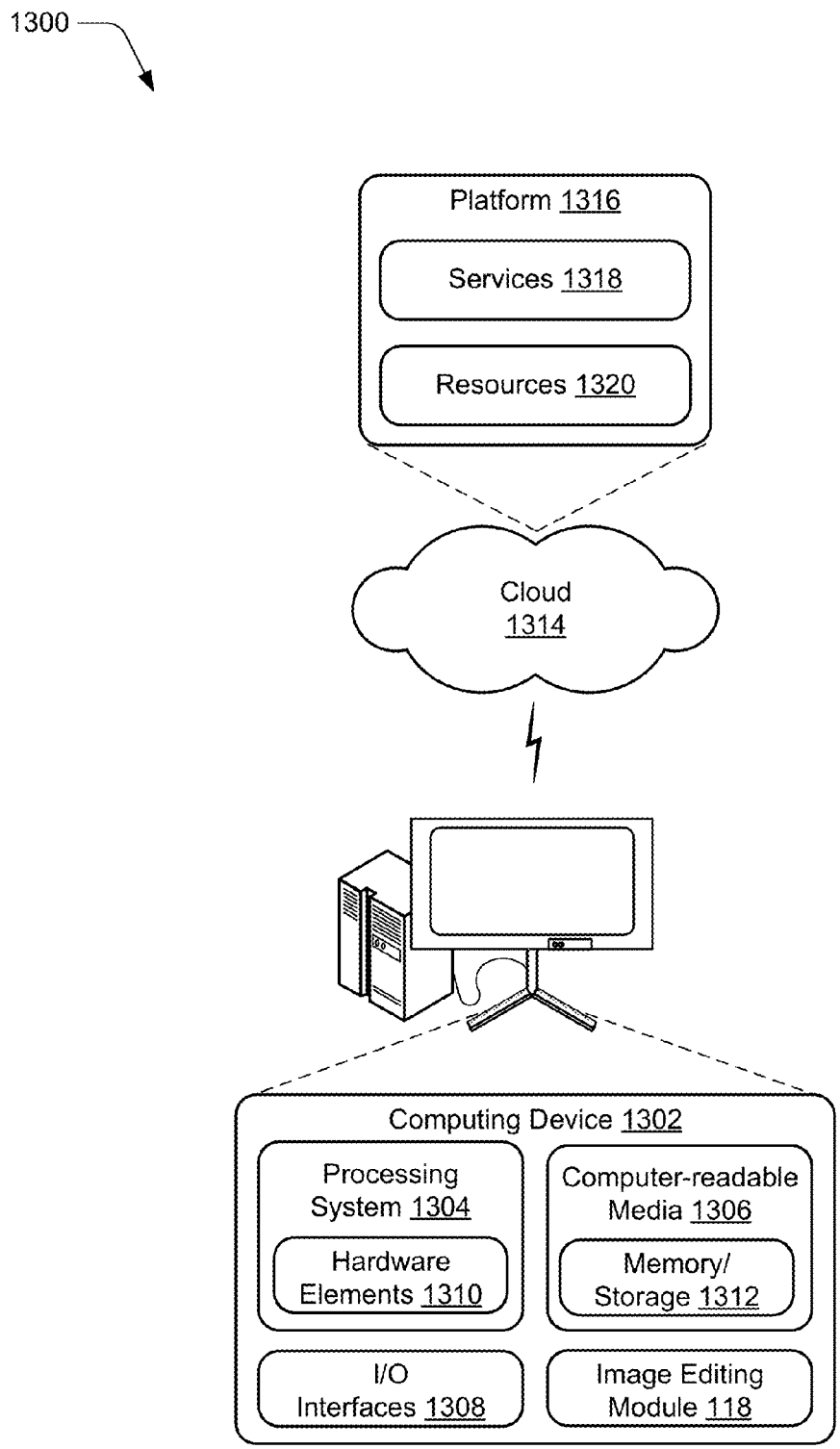
FIG. 13 illustrates various components of an example device that can be implemented as any type of computing device as described herein to implement the techniques described herein.

FIG. 13 illustrates an example system generally at 1300 that includes an example computing device 1302 that is representative of one or more computing systems and/or devices that may implement the various techniques described herein. This is illustrated through inclusion of image editing module 118, which is configured to enhance the image resolution of an image using a set of related images. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below. The cloud 1314 includes and/or is representative of the platform 1316 for services 1318 and/or resources 1320. For example, the services 1318 may include the image service 110 described with reference to FIG. 1.

Platform 1316 abstracts underlying functionality of hardware, such as server devices (e.g., included in the services 1318) and/or software resources (e.g., included as the resources 1320), and connects the computing device 1302 with other devices, servers, etc. Resources 1320 may include applications and/or data that can be utilized while computer processing is executed on servers that are remote from the computing device 1302. Resources 1320 can also include services 1318 provided over the Internet and/or through a subscriber network, such as a cellular or Wi-Fi network.

Platform 1316 may abstract resources and functions to connect computing device 1302 with other computing devices. Platform 1316 may also serve to abstract scaling of resources to provide a corresponding level of scale to encountered demand for resources 1320 that are implemented via platform 1316. Accordingly, in an interconnected device embodiment, implementation of functionality described herein may be distributed throughout system 1300. For example, the functionality may be implemented in part on computing device 1302 as well as via platform 1316 that abstracts the functionality of cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention. Further, various different embodiments are described and it is to be appreciated that each described embodiment can be implemented independently or in connection with one or more other described embodiments.

What is claimed is:

1. A method to enhance image resolution of a cropped image using a set of related images, the method comprising:
   dividing, by one or more processors, the cropped image and each of the related images into blocks that each include a subset of pixels of a respective image, one or more of the blocks in the related images having one or more features that match one or more features of respective counterpart blocks in the cropped image;
   determining, by the one or more processors, blocks in the related images that have a relatively higher resolution than the respective counterpart blocks in the cropped image; and
   replacing, by the one or more processors, one or more of the counterpart blocks in the cropped image with respective determined blocks from the related images to enhance the image resolution of at least a portion of the cropped image.

2. A method as recited in claim 1, further comprising selecting the set of related images from a plurality of images by filtering the plurality of images based on metadata associated with the cropped image.

3. A method as recited in claim 2, wherein the metadata associated with the cropped image includes one or more of a capture date or a global position system (GPS) coordinates associated with the cropped image, the capture date representing a date that the cropped image was captured by an image capturing device, and the GPS setting representing a physical location where the cropped image was captured.

4. A method as recited in claim 1, further comprising extracting features from the cropped image or the related images by at least transforming the cropped image or the related images into a collection of local feature vectors that are invariant to one or more of scaling, rotation, or translation of the cropped image or the related images.

5. A method as recited in claim 1, further comprising partitioning the cropped image and each of the related images into the blocks based on locations of features in each said image and pixel intensity differences proximal to the locations.

6. A method as recited in claim 1, wherein said replacing includes projecting one or more pixels from the respective determined blocks in the related images onto the one or more of the counterpart blocks in the cropped image.

7. A method as recited in claim 1, further comprising:
   detecting features in the cropped image;
   extracting features from the related images; and
   mapping the features detected in the cropped image to matching features extracted from the related images.

8. A method as recited in claim 1, wherein the determining comprises:
   mapping a counterpart block in the cropped image to a block in a single related image; and
   selecting the block from the single related image for replacement of said counterpart block in the cropped image based on the block having a size that is at least one and a half times a size of said counterpart block.

9. A method as recited in claim 1, wherein the determining comprises:
   mapping a counterpart block in the cropped image to multiple related images; and
   selecting a particular block from one of the multiple related images for replacement of the counterpart block in the cropped image based on the particular block having:
      at least a maximum number of features matching the one or more features in the counterpart block from the cropped image in comparison to additional blocks from the multiple related images that include one or more features that match the one or more features in the counterpart block from the cropped image; and
      a relatively largest size in comparison to respective sizes of the additional blocks from the multiple related images.

10. A method as recited in claim 1, wherein the replacing comprises:
    creating a projection matrix using locations corresponding to features in a counterpart block in the cropped image; and
    projecting the subset of pixels from a determined block in a related image into the counterpart block in the cropped image to correspond to an original alignment in the cropped image based on the projection matrix.

11. A method as recited in claim 1, further comprising:
    cropping an image to create the cropped image;
    enlarging the cropped image effective to cause pixilation and create an enlarged pixilated version of the cropped image; and
    receiving a request to enhance image resolution of the enlarged pixilated version of the cropped image using the set of related images.

12. A system, comprising:
    one or more processors; and
    a memory having instructions that are executable by the one or more processors to implement an image service that is configured to enhance image resolution of an input image using a set of related images, the image service configured to:
       divide the input image and the related images into blocks that each contain a subset of pixels of a respective image;
       determine the blocks in the related images that have a relatively higher resolution than respective counterpart blocks in the input image; and
       project pixels from the determined blocks in the related images onto respective counterpart blocks in the input image to generate an output image that has enhanced image resolution in comparison to the input image.

13. A system as recited in claim 12, wherein the image service further comprises a filter module configured to filter a plurality of images based on metadata associated with the input image to identify the set of related images from among the plurality of images.

14. A system as recited in claim 12, wherein the image service further comprises a feature matching module that is configured to map features in the input image to matching features in one or more of the related images.

15. A system as recited in claim 12, wherein the image service is configured to determine the blocks in the related images that have a relatively higher resolution than respective counterpart blocks in the input image based on:
   at least a maximum number of features that match one or more features in the respective counterpart block from the input image in comparison to additional blocks from the related images that include one or more features that match the one or more features in the counterpart block from the input image; and
   a relatively largest size in comparison to respective sizes of the additional blocks from the related images.

16. Computer-readable storage memory comprising stored instructions that are executable by a computing device to implement an image service configured to perform operations comprising:
   dividing a cropped image and each related image from a set of related images into blocks that each include a subset of pixels of a respective image, one or more of the blocks in the related images having one or more features that match one or more features of respective counterpart blocks in the cropped image;
   determining blocks in the related images that have a relatively higher resolution than the respective counterpart blocks in the cropped image; and
   replacing one or more of the counterpart blocks in the cropped image with respective determined blocks from the related images to enhance image resolution of at least a portion of the cropped image.

17. Computer-readable storage memory as recited in claim 16, wherein the operations further comprise selecting the set of related images from a plurality of images by filtering the plurality of images based on metadata associated with the cropped image.

18. Computer-readable storage memory as recited in claim 16, wherein the metadata associated with the cropped image includes one or more of a capture date or a global position system (GPS) coordinates associated with the cropped image, the capture date representing a date that the cropped image was captured by an image capturing device, and the GPS setting representing a location where the cropped image was captured.

19. Computer-readable storage memory as recited in claim 16, wherein the operations further comprise extracting features from the cropped image or the related images by at least transforming the cropped image or the related images into a collection of local feature vectors that are invariant to one or more of scaling, rotation, or translation of the cropped image or the related images.

20. Computer-readable storage memory as recited in claim 16, wherein said replacing includes projecting one or more pixels from the respective determined blocks in the related images onto the one or more of the counterpart blocks in the cropped image.

* * * * *